R. H. KIRK.
PLATE PRINTING MACHINE.
APPLICATION FILED JULY 11, 1905.
956,807.
Patented May 3, 1910.
9 SHEETS—SHEET 1.
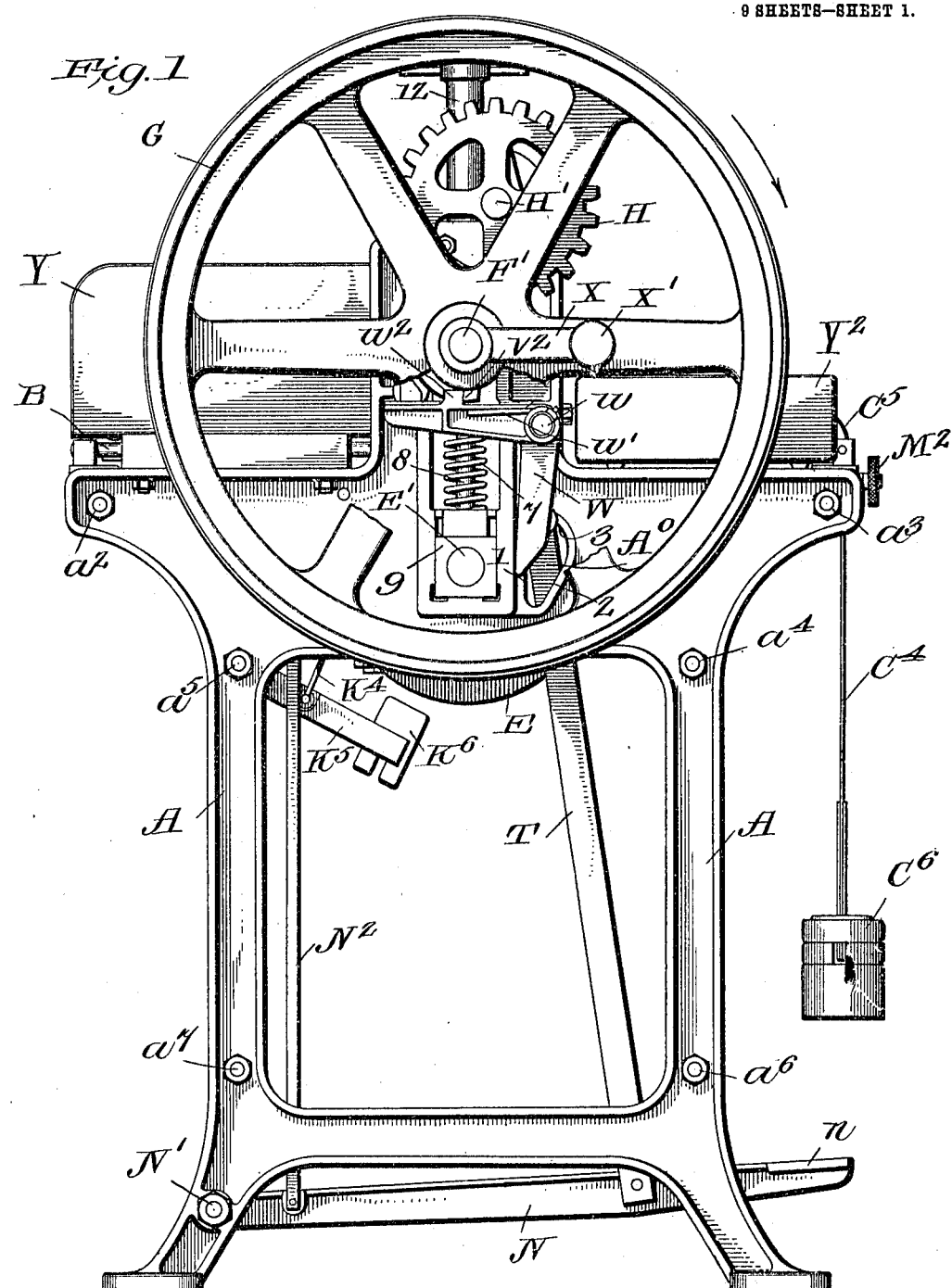
Witnesses
Geo. T. Bynne.
Harry V. Reubam.
Inventor,
R. H. Kirk
by Wilkinson & Fisher,
Attorneys.

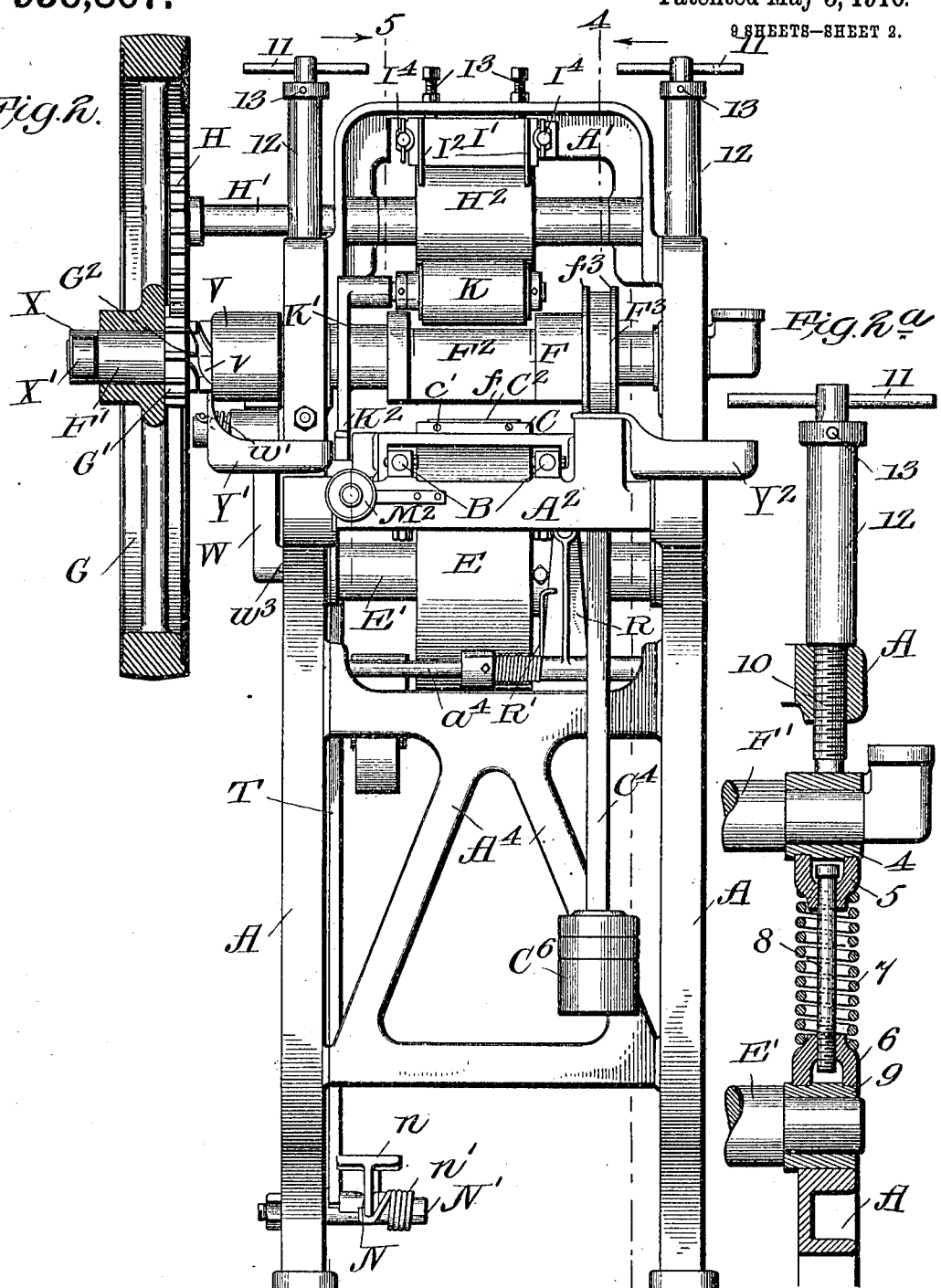

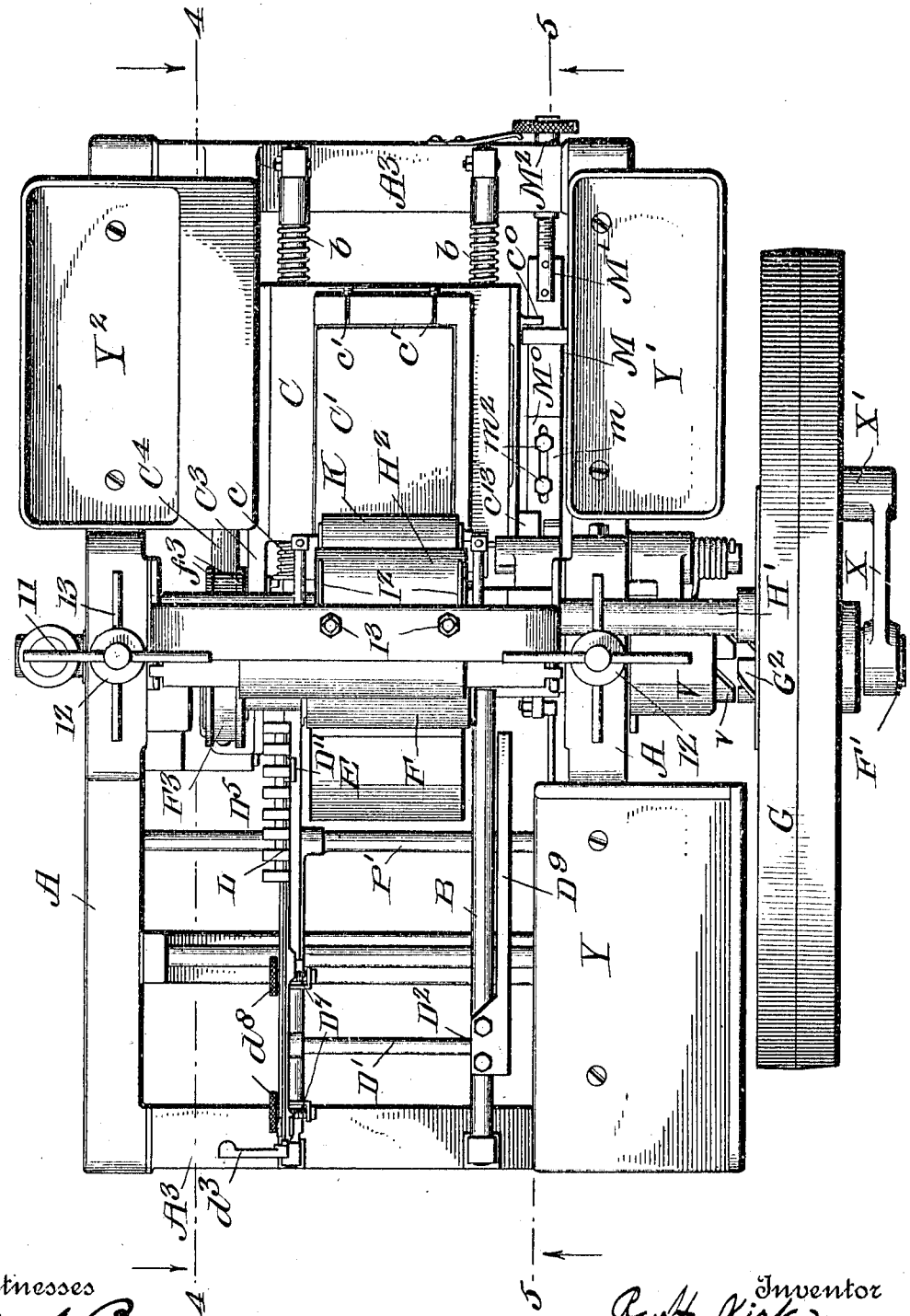

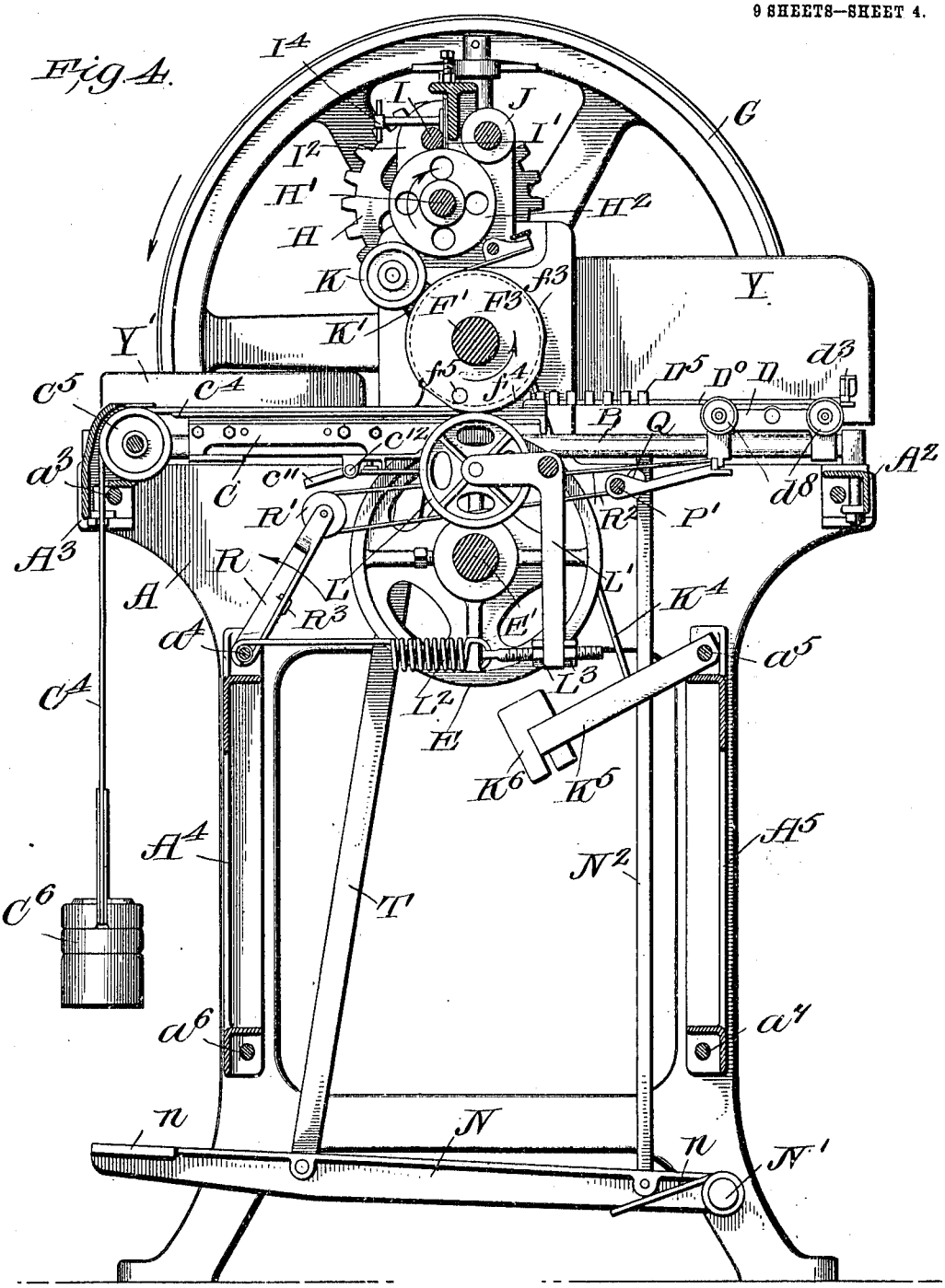

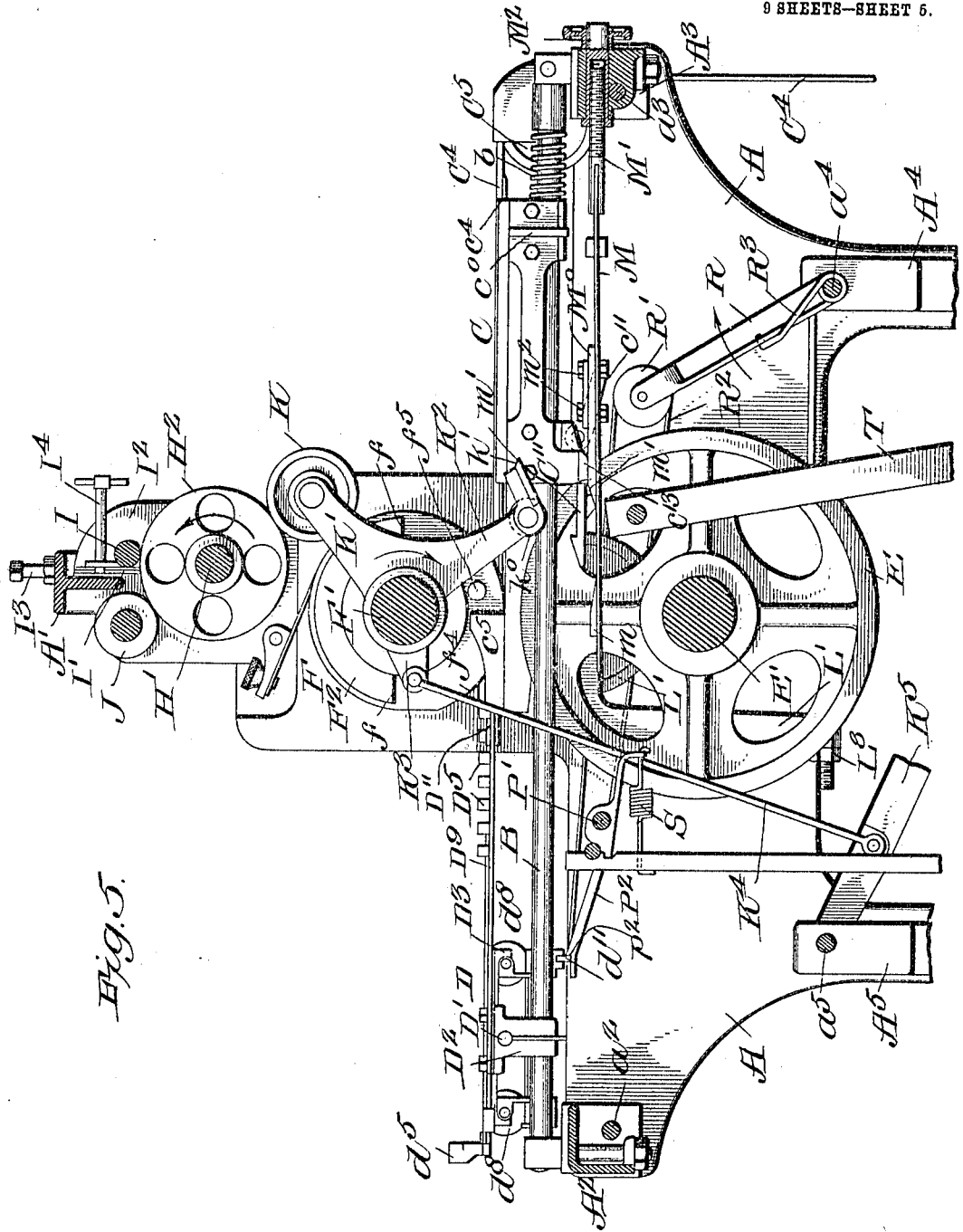

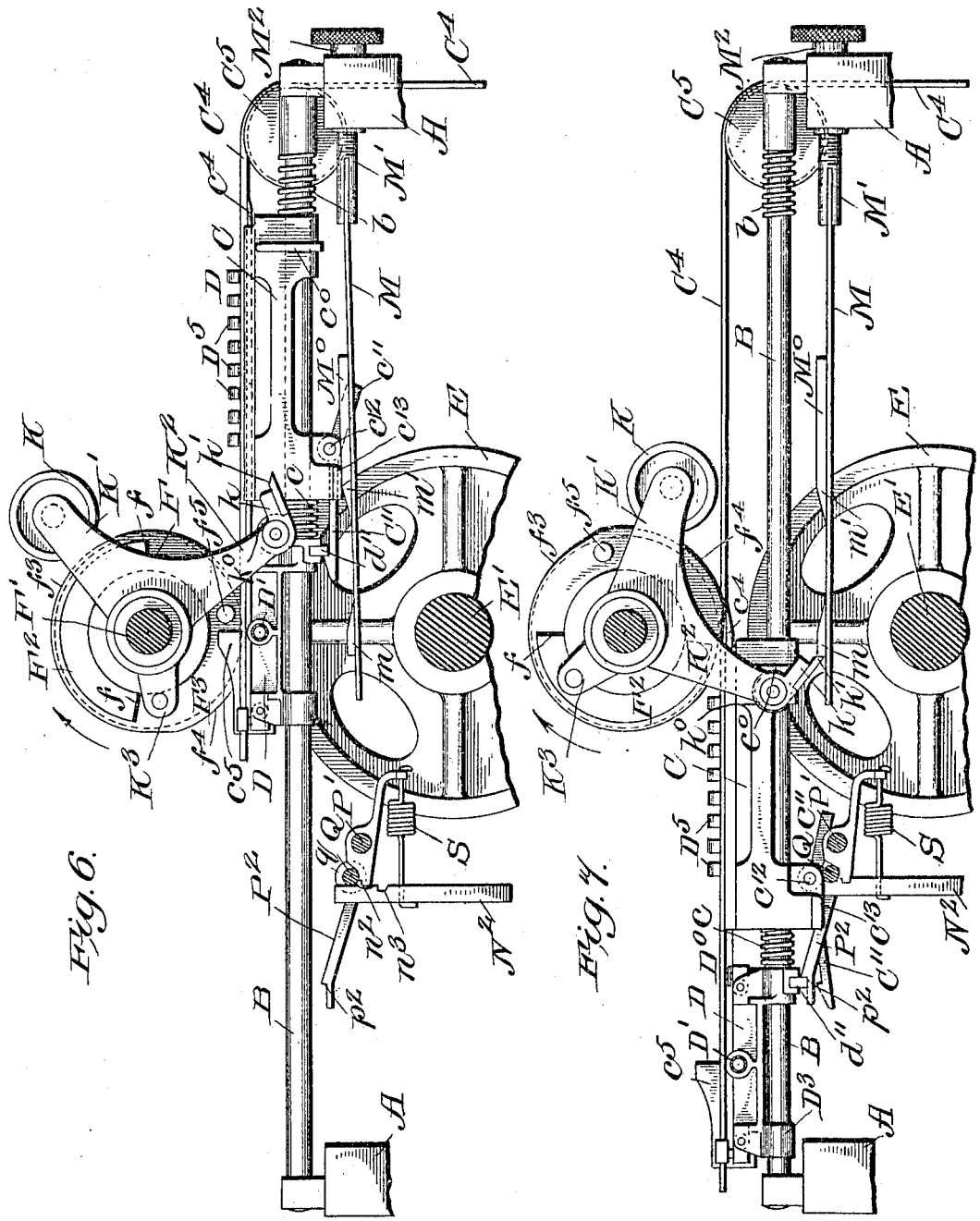

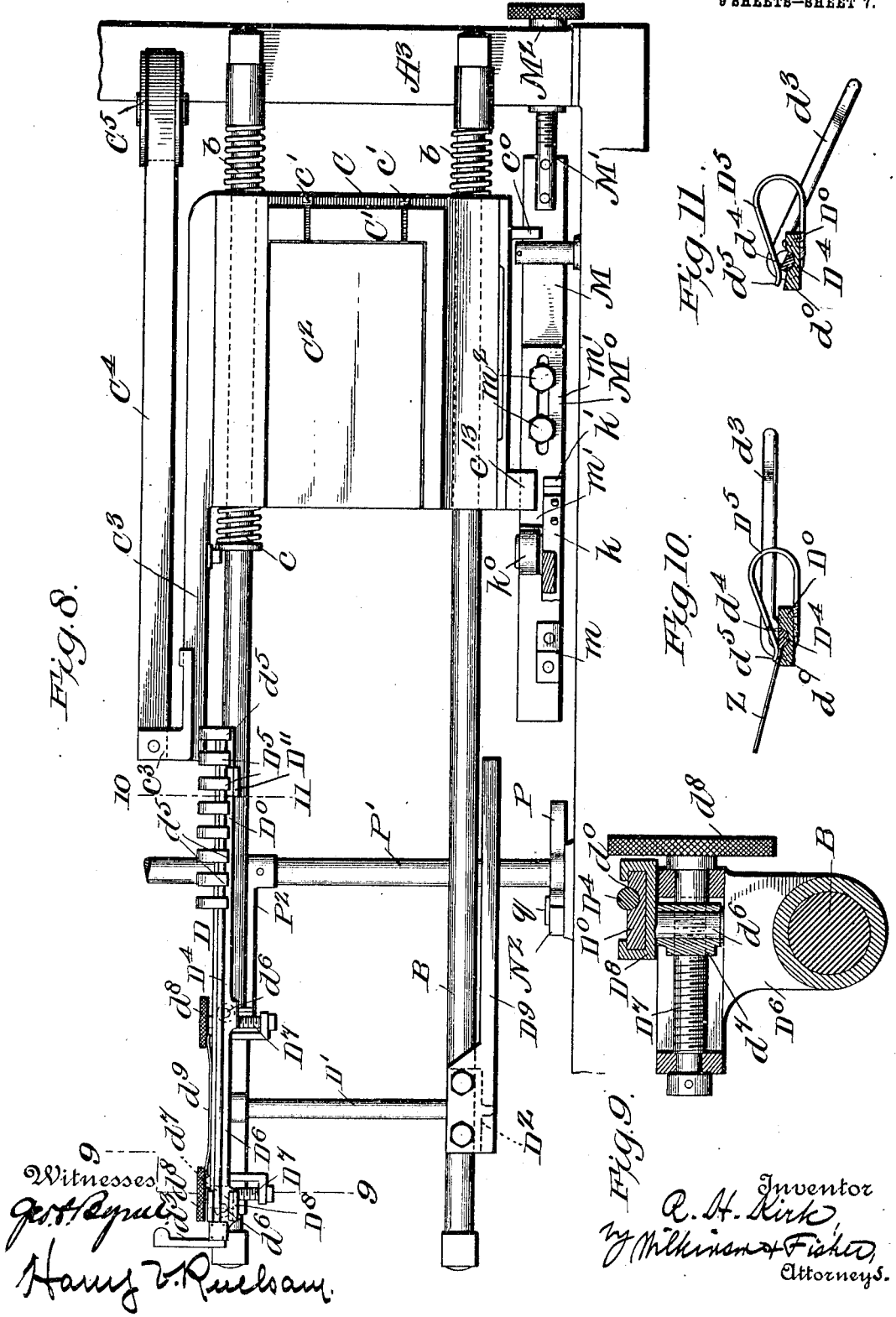

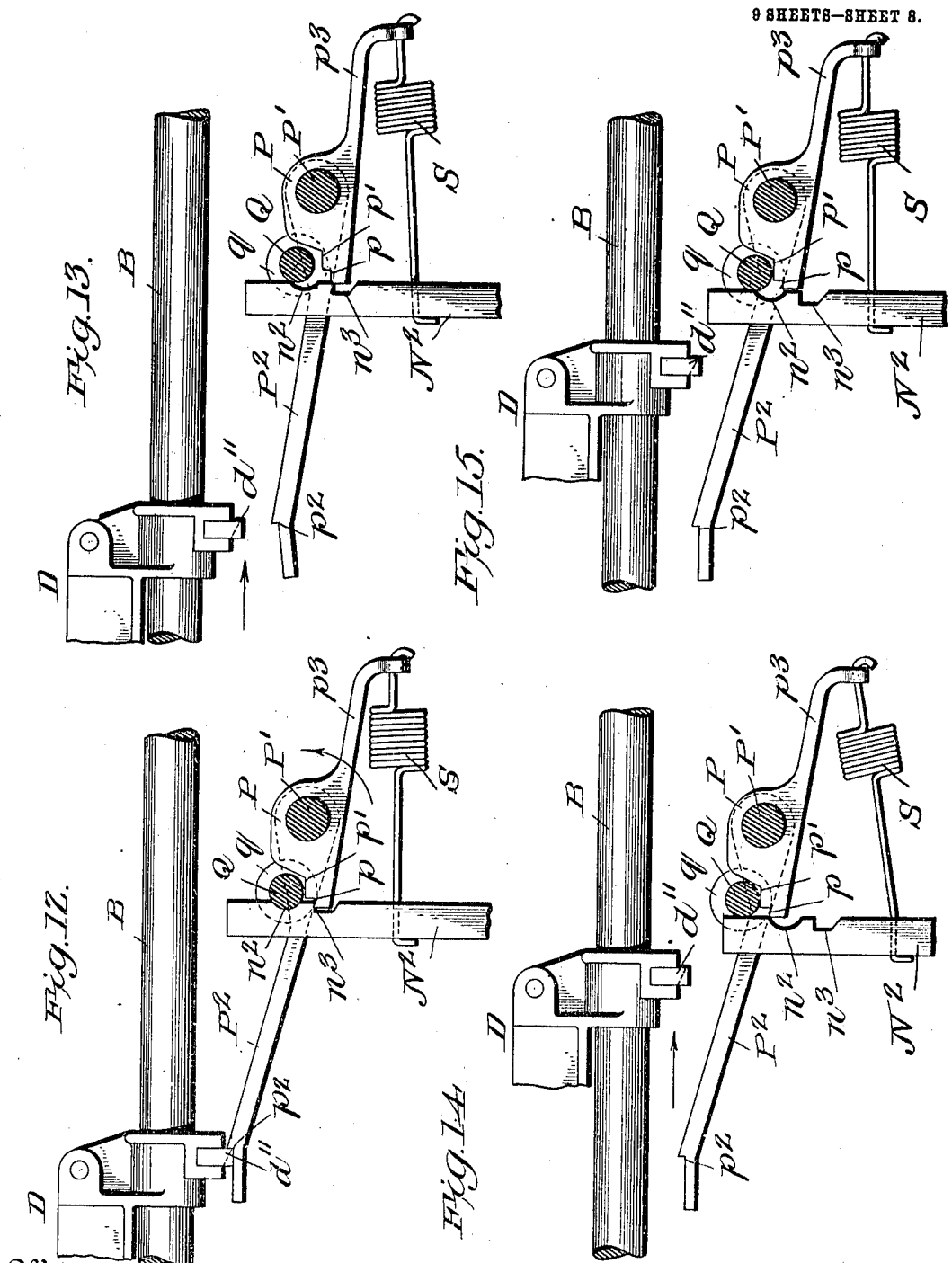

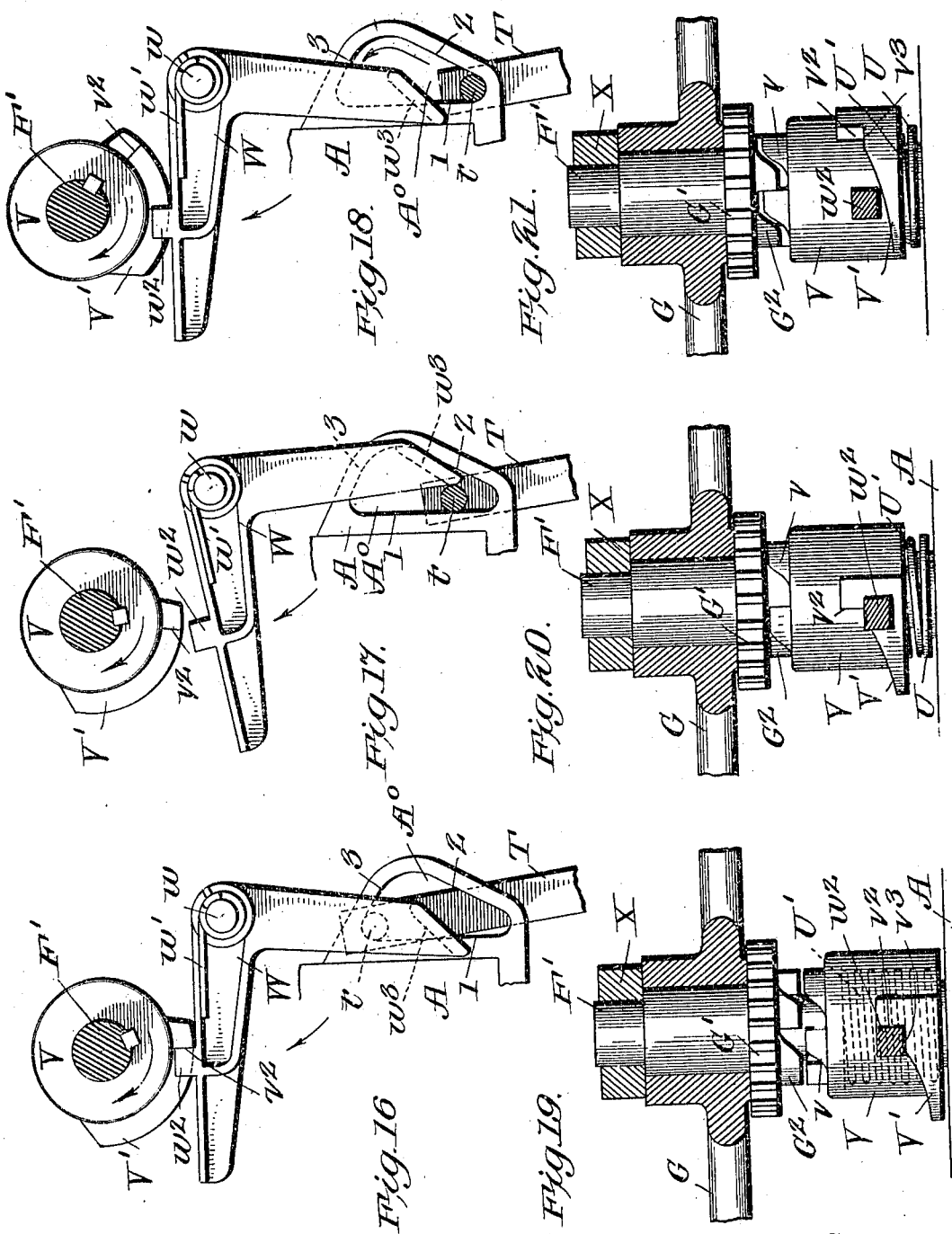

UNITED STATES PATENT OFFICE.

ROBERT H. KIRK, OF CLEVELAND, OHIO, ASSIGNOR TO THE LONG ARM SYSTEM COMPANY, OF CLEVELAND, OHIO, A CORPORATION OF OHIO.

PLATE-PRINTING MACHINE.

956,807.  Specification of Letters Patent.  Patented May 3, 1910.

Application filed July 11, 1905. Serial No. 269,232.

*To all whom it may concern:*

Be it known that I, ROBERT H. KIRK, a citizen of the United States, residing at Cleveland, in the county of Cuyahoga and State of Ohio, have invented certain new and useful Improvements in Plate-Printing Machines; and I do hereby declare the following to be a full, clear, and exact description of the invention, such as will enable others skilled in the art to which it appertains to make and use the same.

My invention relates to presses or machines for printing from engraved plates, and it is intended more especially as an improvement upon the machines described in the patents to J. P. Stevens, Nos. 649,773, granted May 15, 1901, and 764,158, granted July 5, 1904, and entitled improvements in plate printing machines.

My invention will be understood by reference to the accompanying drawings in which the same parts are indicated by the same letters and numerals throughout the several views.

Figure 1 is a side elevation of the improved plate printing press, parts being broken away. Fig. 2 is an end view as seen from the right of Fig. 1, the driving wheel being shown in central vertical section. Fig. 2$^a$ is a detail showing one of the spring supported bearings for the driving wheel. Fig. 3 is a plan view of the machine. Fig. 4 shows a section along the broken line 4—4 of Fig. 2 and looking in the direction of the arrows. Fig. 5 shows a section along the broken line 5—5 of Fig. 2, and looking in the direction of the arrows. Figs. 6 and 7 are complementary views of Fig. 5 and illustrate the action of the inking roller, and certain details of the mechanism are omitted for the sake of clearness in the drawings. Fig. 8 is a plan view showing the plate carriage and the card carrier as detached from the rest of the machine. Fig. 9 shows a section along the line 9—9 of Fig. 8, on an enlarged scale, and Figs. 10 and 11 are detailed views showing the two positions of the card grippers, the section being taken along the line 10—11 of Fig. 8, and on an enlarged scale. Figs. 12, 13, 14 and 15 show diagrammatically the several steps incident to the release of the card carrier. Figs. 16, 17 and 18 show the several steps of the operation of the clutch mechanism, and Figs. 19, 20 and 21 show the clutch mechanism in the various stages indicated in Figs. 16, 17 and 18 respectively.

The machine is mounted on a suitable frame composed of side frames A rigidly connected by separators A', A$^2$, A$^3$, A$^4$, A$^5$ which frames and separators are held together with tie-bolts $a^2$, $a^3$, $a^4$, $a^5$, $a^6$, and $a^7$. Mounted on this frame are two tracks B, preferably in the form of cylindrical rods of metal having more or less resiliency so as to yield somewhat when pressure is applied to the plate carriage. Mounted on these rods are suitable buffers, such as the springs $b$, to take up the shock of the plate carriage when it reaches the end of its route. This plate carriage comprises a bed C held in sliding relation on the rods B and carrying a plate chuck C', see Figs. 3 and 8, and the plate to be printed C$^2$, see Fig. 8, provided with screws $c'$ clamping the plate on the chuck, as described in the Stevens patents aforesaid. This plate carriage is provided with a spring buffer $c$ opposite to the spring buffers $b$ so as to prevent unnecessary jarring when the card carrier is brought to the coupling position, as will be hereinafter described. This plate carriage is provided with a forwardly projecting arm C$^3$ having a horn $c^3$ to which the strap C$^4$ and steel strip $c^4$ are connected, see Figs. 6 and 8. The strip $c^4$ terminates about the front end of the carriage, as shown in Fig. 4, and is rigidly attached to the strap C$^4$ in any convenient way. The strap passes over the pulley C$^5$, and carries a weight C$^6$, see Fig. 4, and the tendency of this weight is to hold the carriage in the front position before the operator who faces the machine from the left in Fig. 4, while the operator or feeder who feeds the cards and removes the same from the machine faces the machine from the right of Fig. 4.

The card carrier D, shown most clearly in Figs. 3, 5 and 8 comprises a frame held in sliding relation on the rods B. This frame is provided with a cross piece D' spanning the rods B and engaging one of the rods B, as at D$^2$, to prevent the tilting of the carrier laterally. The opposite end of this cross piece D' is connected to the side frame D$^6$. Mounted to rock on the card carrier is the rod D$^4$ which is cut away in the path of the card grippers D$^5$, as at $d^4$, see Figs. 10 and 11, and this rod is provided with a lug or arm $d^3$ adapted to be struck by the wrist of the feeder.

The card gripper consists of a series of bent spring fingers $D^5$, which are secured to the bar $D^\circ$ at one end, and have the other end bent over as at $d^5$ to grip the edge of the card Z, see Fig. 10, when it is held in place on the carrier. To release the card rock the rod $D^4$ to the position indicated in Fig. 11 when all of the gripping fingers will be lifted and the card may be withdrawn. The effect of these spring fingers acting on the flattened face of the rod $D^4$ will tend to snap the rod back to the initial position shown in Fig. 10, except when the feeder presses down on the wrist lug $d^3$. Consequently when this wrist lug is released, the gripping fingers will snap back to the initial position so that the feeder may press with one hand on the wrist lug $d^3$ and take out the printed card, insert a fresh card to be printed, and on lifting her wrist the gripper will automatically grip the card.

In order to prevent smearing in lifting the card from the plate, after it has been printed, I provide an inclined face $d^\circ$ in the bar $D^\circ$ just under the gripping fingers so that the card will be held normally in the tilted position. When it goes between the compression rollers, as will be hereinafter described, it will be pressed down during the operation of printing, and after passing through the rollers the resiliency of the card will cause it to spring up clear of the plate, when it may be readily caught between the fingers of the feeder and withdrawn.

In order to provide for the proper adjustment of the card carrier the bar $D^\circ$ is pivoted on trunnions $d^6$, shown in Figs. 8 and 9, which are journaled in lugs carried by the nuts $d^7$, which engages the screws $D^7$ turned by the knurled heads $d^8$. There are two of these screws $D^7$, and by turning them together, the bar $D^\circ$ may be moved transversely, or by turning one or the other of these knurled heads $d^8$ the bar $D^\circ$ may be swung through an angle laterally, thus swinging the card grippers through an angle for adjusting the card holder. One of these trunnions $d^6$ may be integral with a yoke $D^8$, see Figs. 8 and 9, in which one end of the bar $D^\circ$ is held. A locking spring $d^9$ is preferably provided to hold the two heads $d^8$ in adjustment during the vibrations to which the card carrier is subjected.

Where wide cards or sheets are used, the free end of the card or sheet rests on the side bar $D^9$, which may be provided for this purpose. A sliding stop $D^{11}$ is provided to adjust the end of the card relative to the grippers. This stop may be slid along the bar $D^\circ$ under the gripping fingers when the latter are lifted, and is made longer than the space between the consecutive gripping fingers, so as to be clamped firmly by one or more of said fingers when the card carriage is in operation.

E represents the bed roller which is mounted on a shaft $E'$ in the bearings 9. Above this bed roller E is journaled the impression roller F, which is mounted on the shaft $F'$. In order to partially support the weight of this shaft $F'$, and the parts carried thereby, I provide spring supported bearings, such as indicated in Fig $2^a$, on which the shaft $F'$ is journaled in bearings 4 above the yoke 5, which is connected to the yoke 6 resting on the bearing 9 by the bolt 8 which slides in the upper yoke 5, and between these yokes 5 and 6 the coil spring 7 is mounted under compression. The compression of this spring may be adjusted by screwing down on the screw 10 by means of the capstan bar 11.

12 represents a lock nut which may be turned by the capstan bar 13, so that the bearing may be adjusted to the requisite compression of the spring 7, and may be locked in the proper position.

The impression roller F carries a tubular shell $F^2$, which is cut away or interrupted, as at $f$, so that this tubular shell will only be in engagement during a portion of each revolution of the shaft $F'$. This shaft $F'$ has mounted loosely thereon the combined pulley and fly wheel G which is coupled onto the shaft and automatically uncoupled therefrom once in each revolution of the shaft, as will be hereinafter described. This fly wheel G is driven by a belt, or may be driven by an electric motor or any other convenient source of power, not shown.

The impression roller F has at one end a cylindrical driving surface $F^3$ flanged as at $f^3$, which engages the top surface of the strap $C^4$ beneath which is secured the steel strip $c^4$ as already described. These flanges $f^3$ are not concentric with the cylindrical surface $F^3$, but are so designed that through part of the circumference $f^4$ they are deeper than the combined thickness of the strap $C^4$, and the strip $c^4$ secured thereto; whereas, in other parts of the circumference, the depth of the flanges is less than the combined thickness of the strap $C^4$ and the strip $c^4$, so that the roller L will, during part of each revolution of the shaft $F'$ bear against the portion of the flanges $f^4$, out of contact with the strap $C^4$, and at other times will bear positively on this strap. This roller L is pressed upward toward the shaft $F'$ by means of the bell crank $L'$, and the spring $L^2$ which is secured to one of the tie-bolts $A^4$, (see Fig. 4) and the tension of which is adjusted by means of the lock nuts $L^3$. The tension of this spring $L^2$ should be such that when the roller L presses against the strip $c^4$, it will cause the friction between the strap $C^4$ and the cylindrical surface $F^3$ to push the plate carriage toward the feeder, at the same time pulling the strap $C^4$ over the pulley $C^5$ and lifting the weight $C^6$.

The parts are shown in the initial position in Figs. 4 and 5 from opposite sides of the machine, in which the broadened flange $f^4$ presses the roller F clear of the strip $c^4$ and allows the weight $C^6$ to draw the carriage back to and hold it at the operator's end of the machine. If the shaft $F'$ rotates in the direction of the arrow of Figs. 4 and 5, the pin $f^5$ will strike the lug $c^5$ pushing the carriage slightly toward the feeder and causing the broadened flange to pass clear of the pulley L allowing the cylindrical surface $F^3$ to engage the strap $C^4$, and thus force the plate carrier between the bed roller and the impression roller.

When the plate carriage is carried between the bed roller and the impression roller, as described, the card carrier will be normally coupled with the plate carriage, as will be hereinafter described, and the printing will be done without any tendency to push the card forward on the plate, thus preventing smearing. The linear speed of the plate carriage should be the same as that of the impression roller to prevent this pushing longitudinally on the card, and this is accomplished by having the radius of the impression surface of the impression roller substantially the same as the radius of the frictional surface $F^3$.

The shaft $F'$ is intermittently coupled to the driving wheel G, as will be hereinafter described, and this driving wheel has secured to its hub a pinion $G'$ meshing with the gear wheel H on the shaft $H'$, which carries the ink roller $H^2$, which rotates continuously in the direction of the arrow in Figs. 4 and 5, and receives the ink from the ink roll I placed in front of the scraper $I'$, and between the guards $I^2$.

The ink is distributed on the roller $H^2$ by the scraper $I'$, and by the distributing roll J, which preferably has a longitudinally reciprocating motion, as is well known in the art. This scraper $I'$ may be adjusted by means of the screws $I^3$, and the clamp $I^4$.

The inking roller K receives its ink from the roller $H^2$, and is mounted on a bell crank having the arms $K'$ and $K^2$, and the short arm $K^3$, which bell crank rocks on the shaft $F'$.

The plate carriage C carries on one side a lug $c^6$, which engages the roller $k^o$ carried by the bell crank arm $K^2$, thus rocking the bell crank when the said lug engages the said roller $k^o$, bringing the ink roller K down to the inking position, as shown in Fig. 7. The arm $K^2$ also carries a lug $k$ preferably provided with a separate shoe piece $k'$ adapted to engage the catch $m$ on the resilient plate M to hold the roller in inking position when the plate carrier returns to the initial position, so that the card plate will be inked by the inking roller as the plate carriage returns to the operator's end of the machine, ready for wiping.

After the plate has been inked, the lug $c^{13}$ strikes the inclined face $m'$ on the piece $M^o$ carried by the plate M, pressing said plate down and causing the catch $m$ to release the shoe piece $k'$. The bell crank will be rocked back to the initial position, shown in Fig. 5, by means of the weight $K^6$ carried by the pivoted arm $K^5$ connected by the rod $K^4$ to the short arm $K^3$ on the bell crank.

In order to adjust the time of release of the inking roller, the plate $M^o$ having the inclined face $m'$ may be made adjustable on the resilient plate M, as by means of the bolts or pins $m^2$ projecting in an elongated slot in the plate, as shown in Figs. 3, 5 and 8.

In order to press the inking roller more or less forcibly against the plate, the screw $M'$ and knurled nut $M^2$ give longitudinal adjustment of the piece M and consequently angular adjustment of arm $K^2$ of bell crank.

The motion of the card carrier and of the plate carriage, and also of the clutch mechanism are controlled by a treadle N having a shoe piece $n$, and pivoted as at $N'$ to the frame of the machine. This treadle is normally held in the raised position by means of a suitable spring $n'$, see Figs. 2 and 4.

Pivoted to the treadle are the rod T, for controlling the clutch mechanism, hereinafter to be described, and the rod $N^2$, which releases the card carriage and allows it to be removed toward and coupled onto the plate carriage, as will now be described.

Referring particularly to Figs. 4 and 5, R represents an arm which rocks on one of the tie-bolts $a^4$, and is normally pressed outward in the direction of the arrow, see Figs. 4 and 5, by means of a spring $R^3$. This arm carries a pulley $R'$, over which passes the strap $R^2$, one end of which strap being fast to any suitable part of the framework, such as the rock shaft $P'$, and the other end of this strap is connected to any suitable part of the card carrier, so that the spring $R^3$ tends to force the card carrier toward the plate carriage, but this movement is normally prevented by the engagement of the lug $d^{11}$ with the catch $p^2$ on the arm $P^2$, as shown in Figs. 5 and 12 to 15. This arm $P^2$ is fast on the rock shaft $P'$ and this shaft carries, preferably at the opposite side of the machine, a lever P, which has a catch $p$ and a shoulder $p'$, as also an arm $p^3$ normally constrained by the spring S connected to the rod $N^2$. This rod is cut away, as at $n^2$, to register with a stud Q between the flange $q$ and the side of the frame of the machine. This flange serves as a guide for said rod. This rod is also notched as at $n^3$ to engage the catch $p$ on the lever P when in the initial position, as shown in Fig. 12.

When the treadle is pressed down, the early part of its motion will drag the rod $N^2$ down from the position in Fig. 12 to that shown in Fig. 13. This will rock the lever P, and with it the rock shaft $P'$ and the arm $P^2$ to the position shown in Fig. 13. As soon as the notch $p^2$ is disengaged from the lug $d^{11}$, the card carrier will move forward in the direction of the arrow shown in Figs. 13 and 14, reaching the position indicated in Fig. 14. The further downward movement of the rod $N^2$ will clear the notch $n^3$ from the catch $p$ and the spring S will snap the lever P and with it the arm $P^2$ back to the initial position.

As the card carrier returns to the initial position at the feeder's end of the machine, the lug $d^{11}$ will cam down the arm $P^2$ until said lug passes the catch $p^2$, when this catch will spring up again to the position shown in Fig. 12, preventing the return movement of the card carrier toward the plate carriage under the action of the spring $R^3$. As the rod $N^2$ rises upward again, as it will do when the treadle is released, it is held by the stud Q clear of the catch $p$, as shown in Fig. 15, until the initial position, shown in Fig. 12, is reached.

When the card carrier is released, as has just been described with reference to Figs. 12 to 15, it flies forward toward the plate carriage under the action of the spring $R^3$ and it strikes the buffer $c$ in the position shown in Fig. 6. Just before reaching the end of its travel toward the plate carriage, the lug $d^{11}$ wedges down the spring catch $C^{11}$, see Fig. 6, and couples the card carrier to the plate carriage. The two then move as one under the action of the cylindrical surface $F^3$, and the roller L on the strap $C^4$ and strip $c^4$, as already described.

The card carrier is automatically uncoupled from the plate carriage by means of the downwardly inclined arm $c^{11}$, which projects from the spring catch $C^{11}$ and engages the rock shaft $P'$, see Fig. 7, just after the card carrier has reached the limit of its travel toward the feeder's end of the machine. This spring catch $C^{11}$ is mounted on a pin $c^{12}$ having a coil spring thereon to restore the parts to the normal position when released.

While, for the sake of clearness, I have explained the independent operation of the several devices, these are controlled *seriatim* by the driving wheel 6, which is intermittently connected to the shaft $F'$ by the clutch mechanism that will now be described.

Referring more particularly to Figs. 1, 2, 3 and 16 to 21, the hub of the drive wheel G is provided with a clutch member $G^2$ having the usual inclined teeth which mesh with teeth $v$ of the opposite clutch member V, which is in the form of a hollow cylinder containing a helical spring $U'$, which reacting against the washer U on the shaft $F'$, normally tends to press the cylinder axially toward the drive wheel G, tending to cause the clutch members to engage. This tendency of the clutch members to engage is controlled by the cam $V'$ secured to the cylinder V and having the shoulder $v^2$, and the lug $w^2$ on the bell crank W, which rocks on the pin $w$, and is normally pressed upward in the direction of the arrow in Figs. 16, 17, and 18, by means of the spring $w'$. The lower arm of this bell crank W carries a cam lug $w^3$, which normally projects in front of an opening $A°$ in the frame of the machine having three sides 1, 2 and 3. Into this opening the stud $t$, near the top of the rod T, projects, which rod is pivoted to the treadle N. In the normal position of the treadle, shown in Figs. 1 and 4, this stud $t$ will be in the upper corner of the triangular opening, as shown in Fig. 16, while under the action of the spring $w'$, the lug $w^2$ will engage the shoulder $v^2$, and the cam lug $w^3$ will be below the stud $t$. Now, when the treadle is pressed down, the first action will be to release the card carrier by means of the rod $N^2$, as already described. The second action of the treadle, in its downward movement, will be to cause the stud $t$ to move down along the edge 1 of the opening $A°$, and the weight of the rod T will cause this stud to travel down this edge. When the stud $t$ strikes the cam lug $w^3$ it will press said cam lug backward, rocking the bell crank W to the position shown in Fig. 17, and withdrawing the lug $w^2$ from engagement with the shoulder $v^2$, see Fig. 17. This will cause the spring $U'$ to snap the clutch members in engagement, as shown in Fig. 20. The further downward movement of the stud $t$ will cause it to clear the cam lug $w^3$, and the spring $w'$ will snap the bell crank back to the initial position, as shown in Fig. 18. During this time, the shaft $F'$ will have been making a partial revolution in the direction of the arrow and the lug $w^2$ will almost immediately come into engagement with the cam $V'$, thus wedging the cylinder V back against the spring $U'$. By the time that this lug $w^2$ has reached nearly the top of the cam face $V'$, the teeth of the clutch will have become disengaged, but the inertia of the parts connected to the shaft $F'$ will cause the revolution of said shaft to continue for an instant after these teeth have become disengaged, will cause the flat face $v^3$ to pass under the lug $w^2$, and will cause the shoulder $v^2$ to bring up against said lug $w^2$, thus arresting the further rotation of the shaft $F'$ and restoring the parts to the initial position, shown in Figs. 16 and 19. This inertia of the shaft $F'$, and of the parts carried thereby may be augmented, if desired, by an arm X secured to the shaft, and a weight $X'$ carried by said arm, this weight and arm being so arranged as to get a maximum torsional effect when the clutch members reach the disengaged position. Thus it will be seen that the shaft F' will be caused to make one complete revolution, and no more, every time the treadle is pressed down by the operator, and the operative parts of the machine cannot be injured from any carelessness or negligence on the part of the operator in failing to release the treadle at any particular moment.

For convenience in operating the machine trays Y, Y', and Y² are provided for carrying the stock or material requisite in the operation of the apparatus.

To recapitulate the operation of the apparatus briefly, the card plate being in place on the plate carriage, pressing down the treadle will cause the card carrier to fly across to and couple onto the plate carriage, and the further motion of the treadle will cause the rod T to release the clutch mechanism and couple the drive wheel G onto the shaft F'. The early motion of rotation of this shaft will cause the pin $f^5$ to strike the lug $c^5$, which will drag the plate carriage and with it the card carrier far enough over the tracks B to allow the strap C⁴ and strip $c^4$ to frictionally engage the roller L and cylindrical surface F³ and the two carriages, coupled together, will be pushed toward the feeder's end of the machine. As the two carriages travel in this direction, the lug $c^9$ on the plate carriage will strike the roller $k^9$ on the bell crank carrying the inking roller, and will swing the inking roller down to the inking position after the two carriages have passed between the bed roller and the impression roller, the parts then being in the position shown in Fig. 7. At this time the spring catch $m$ will engage the shoe piece $k'$ holding the inking roller down in the operative position, and the arm $c^{11}$ on the spring catch C¹¹ will engage the rock shaft P' disengaging the spring catch C¹¹ and uncoupling the plate carriage from the card carrier. The card carrier will be locked by the catch P² engaging the lug $d^{11}$, and thus will be held at the feeder's end of the machine. The deepened flange $f^4$ will by this time have pressed the roller L down far enough to release the friction on the strap C⁴, and the weight C⁶ acting on this strap will drag the plate carriage back to the operator's end. During its movement toward this end of the machine, the plate carriage will pass under the inking roller, and the plate will be inked, and as soon as it has passed under said roller, the lug $c^{13}$ will engage the cam face $m'$, withdrawing the catch $m$, and allowing the weight K⁶ to swing the inking roller back to the initial position, shown in Fig. 5. This completes the cycle of operations, and leaves the plate ready for wiping, but so far no printing has been done.

Now, the plate is wiped at the operator's end, the card is inserted at the feeder's end, and pressing down on the treadle will cause the same cycle of operations to be reproduced as before, except that the card now being held over the plate by the card grippers will be pressed down on the plate and will be printed, and as soon as it passes from between said rollers the card, owing to its own resiliency, will spring up slightly above the surface of the plate, and may be removed by hand, and a fresh card inserted when the cycle of operations may be repeated indefinitely.

While in the foregoing description I have referred to a card as being printed, I mean by this to refer to any material capable of or suitable for being printed in apparatus of this kind. When the material lacks the necessary resiliency to spring up and clear the surface of the plate, a spring operated tilting frame may be employed for this purpose.

It will be seen that the machine herein described is extremely strong and durable in its manufacture, its parts are of simple construction, and are not likely to get out of order, that in the automatic operation of the various parts special care has been taken to provide against accidents or injuries to the apparatus due to careless or incompetent operators, and that the various adjustments may be quickly and readily made.

It will be obvious that various modifications might be made in the herein described apparatus, which could be used without departing from the spirit of my invention.

Having thus described my invention, what I claim and desire to secure by Letters Patent of the United States, is:—

1. In a plate printing machine, the combination with a frame, a bed roller journaled therein, and an impression roller in the form of a segment of a cylinder mounted above said bed roller, of a plate carriage mounted to vibrate on said frame between said rollers, a card carrier, with means for automatically moving same toward and coupling same to said plate carriage, means for automatically uncoupling said card carrier when it returns to the initial position, automatic means for holding the card carrier in the initial position until released, a strap connected to the plate carriage, with a weight suspended therefrom, a stiff strip connected to said strap, and intermittently acting friction rollers acting upon said strap and strip for imparting a frictional feed to said plate carriage independent of the pressure between the impression rollers, substantially as described.

2. In a plate printing machine, the combination with a frame, a bed roller journaled therein, and an impression roller in the form of a segment of a cylinder mounted above said bed roller, of a plate carriage mounted to vibrate on said frame between said rollers, a card carrier, with means for automatically moving same toward and coupling same to said plate carriage, means for automatically uncoupling said card carrier when it returns to the initial position, automatic means for holding the card carrier in the initial position until released, a strap connected to the plate carriage, with a weight suspended therefrom, a stiff strip connected to said strap, and intermittently acting friction rollers acting upon said strap and strip for imparting a frictional feed to said plate carriage independent of the pressure between the impression rollers, and an ink roller automatically operated by the motion of said plate carriage for inking the plate, substantially as described.

3. In a plate printing machine, the combination with a frame, a bed roller journaled therein, and an impression roller in the form of a segment of a cylinder mounted above said bed roller, of a plate carriage mounted to vibrate on said frame between said rollers, a card carrier, with means for automatically moving same toward and coupling same to said plate carriage, means for automatically uncoupling said card carrier when it returns to the initial position, automatic means for holding the card carrier in the initial position until released, a strap connected to the plate carriage, with a weight suspended therefrom, a stiff strip connected to said strap, and intermittently acting friction rollers acting upon said strap and strip for imparting a frictional feed to said plate carriage independent of the pressure between the impression rollers, with means for holding the card normally at an angle on said card carrier and causing it to project above and clear of the plate, except when pressed between the rollers, substantially as described.

4. In a plate printing machine, the combination with a frame, a bed roller journaled therein, and an impression roller in the form of a segment of a cylinder mounted above said bed roller, of a plate carriage mounted to vibrate on said frame between said rollers, a card carrier, with means for automatically moving same toward and coupling same to said plate carriage, means for automatically uncoupling said card carrier when it returns to the initial position, automatic means for holding the card carrier in the initial position until released, a strap connected to the plate carriage, with a weight suspended therefrom, a stiff strip connected to said strap, and intermittently acting friction rollers acting upon said strap and strip for imparting a frictional feed to said plate carriage independent of the pressure between the impression rollers, and an ink roller automatically operated by the motion of said plate carriage for inking the plate, with means for holding the card normally at an angle on said card carrier and causing it to project above and clear of the plate, except when pressed between the rollers, substantially as described.

5. In a plate printing machine, the combination with a frame, and impression rollers journaled in said frame, of a plate carriage mounted to vibrate on said frame between said impression rollers, and a card carrier provided with a series of resilient fingers for gripping the card and holding it at an angle in the card carrier, a rod journaled in said card carrier and having a flat face normally resting beneath said gripping fingers and allowing the same to grip the card but lifting said gripping fingers when said rod is rocked, substantially as described.

6. In a plate printing machine, the combination with a frame, and impression rollers journaled in said frame, of a plate carriage mounted to vibrate on said frame between said impression rollers, and a card carrier provided with a series of resilient fingers for gripping the card and holding it at an angle in the card carrier, a rod journaled in said card carrier and having a flat face normally resting beneath said gripping fingers and allowing the same to grip the card but lifting said gripping fingers when said rod is rocked, with a wrist lug secured to said rod for rocking the same, substantially as described.

7. A card holding and releasing device for use in machines of the character described, comprising a bar having an inclined face, a rod mounted to rock in said bar and flattened along one side thereof, a series of resilient gripping fingers secured to said bar and engaging said flattened face of said rod and normally tending to restore the same to the initial position and to grip the card beyond the edge of said rod, with means for rocking said rod and thereby releasing all of said fingers from engagement with the card, substantially as described.

8. A card holding and releasing device for use in machines of the character described, comprising a bar having an inclined face, a rod mounted to rock in said bar and flattened along one side thereof, a series of resilient gripping fingers secured to said bar and engaging said flattened face of said rod and normally tending to restore the same to the initial position and to grip the card beyond the edge of said rod, and a wrist lug connected to said rod for rocking the same when desired, substantially as described.

9. In a plate printing machine, the combination with a frame and impression rollers journaled therein, of a plate carriage mounted to vibrate on said frame between said impression rollers and a card carrier also mounted to vibrate on said frame, with means for coupling said plate carriage and said card carrier together, a shaft for driving said impression rollers, a drive wheel loosely mounted on said shaft, clutch mechanism for connecting said drive wheel and said shaft together when desired, and automatic means for disconnecting said clutch mechanism before said shaft has performed a complete revolution, substantially as described.

10. In a plate printing machine, the combination with a frame and impression rollers journaled therein, of a plate carriage mounted to vibrate on said frame between said impression rollers and a card carrier also mounted to vibrate on said frame, with means for coupling said plate carriage and said card carrier together, a shaft for driving said impression rollers, a drive wheel loosely mounted on said shaft, clutch mechanism for connecting said drive wheel and said shaft together when desired, a treadle and mechanism operated thereby for throwing said clutch mechanism into engagement when desired, and means independent of said treadle for automatically throwing said clutch mechanism out of engagement, irrespective of the position of said treadle, before the said shaft completes a single revolution, substantially as described.

11. In a plate printing machine, the combination with a frame and impression rollers journaled therein, of a plate carriage mounted to vibrate on said frame between said impression rollers and a card carrier also mounted to vibrate on said frame, with means for coupling said plate carriage and said card carrier together, a shaft for driving said impression rollers, a friction drive operated by said shaft, for moving said plate carriage, a drive wheel loosely mounted on said shaft, clutch mechanism for connecting said drive wheel and said shaft together when desired, and automatic means for disconnecting said clutch mechanism before said shaft has performed a complete revolution, substantially as described.

12. In a plate printing machine, the combination with a frame and impression rollers journaled therein, of a plate carriage mounted to vibrate on said frame between said impression rollers and a card carrier also mounted to vibrate on said frame, with means for coupling said plate carriage and said card carrier together, a shaft for driving said impression rollers, a friction drive operated by said shaft for moving said plate carriage, a drive wheel loosely mounted on said shaft, clutch mechanism for connecting said drive wheel and said shaft together when desired, a treadle and mechanism operated thereby for throwing said clutch mechanism into engagement when desired, and means independent of said treadle for automatically throwing said clutch mechanism out of engagement, irrespective of the position of said treadle, before said shaft completes a single revolution, substantially as described.

13. In a plate printing machine, the combination with a frame and impression rollers journaled therein, of a plate carriage mounted to vibrate on said frame between said impression rollers and a card carrier also mounted to vibrate on said frame, with means for coupling said plate carriage and said card carrier together, a shaft for driving said impression rollers, a friction drive operated by said shaft, for moving said plate carriage, and an inking roller automatically operated by the motion of the plate carriage, a drive wheel loosely mounted on said shaft, clutch mechanism for connecting said drive wheel and said shaft together when desired, and automatic means for disconnecting said clutch mechanism before said shaft has performed a complete revolution, substantially as described.

14. In a plate printing machine, the combination with a frame and impression rollers journaled therein, of a plate carriage mounted to vibrate on said frame between said impression rollers and a card carrier also mounted to vibrate on said frame, with means for coupling said plate carriage and said card carrier together, a shaft for driving said impression rollers, a friction drive operated by said shaft, for moving said plate carriage, and an inking roller automaticaly operated by the motion of the plate carriage, a drive wheel loosely mounted on said shaft, clutch mechanism for connecting said drive wheel and said shaft together when desired, a treadle and mechanism operated thereby for throwing said clutch mechanism into engagement when desired, and means independent of said treadle for automatically throwing said clutch mechanism out of engagement, irrespective of the position of said treadle, before the said shaft completes a single revolution, substantially as described.

15. In a plate printing machine, the combination with a frame and impression rollers journaled therein, of a plate carriage mounted to vibrate on said frame between said impression rollers, means for holding the card above said plate carriage, a shaft for driving said impression rollers and said plate carriage, a drive wheel loosely mounted on said shaft, clutch mechanism for connecting said drive wheel and said shaft together when desired, and automatic means for disconnecting said clutch mechanism before said shaft has performed a complete revolution, substantially as described.

16. In a plate printing machine, the combination with a frame and impression rollers journaled therein, of a plate carriage mounted to vibrate on said frame between said impression rollers, means for holding the card above said plate carriage, a shaft for driving said impression rollers and said plate carriage, a drive wheel loosely mounted on said shaft, clutch mechanism for connecting said drive wheel and said shaft together when desired, a treadle and mechanism operated thereby for throwing said clutch mechanism into engagement when desired, and means independent of said treadle for automatically throwing said clutch mechanism out of engagement, irrespective of the position of said treadle, before the said shaft completes a single revolution, substantially as described.

17. In a plate printing machine, the combination with a frame and impression rollers journaled therein, of a plate carriage mounted to vibrate on said frame between said impression rollers, means for holding the card above said plate carriage, a shaft for driving said impression rollers, a friction drive operated by said shaft, for moving said plate carriage, a drive wheel loosely mounted on said shaft, and clutch mechanism for connecting said drive wheel and said shaft together when desired, with automatic means for disconnecting said clutch mechanism before said shaft has performed a complete revolution, substantially as described.

18. In a plate printing machine, the combination with a frame and impression rollers journaled therein, of a plate carriage mounted to vibrate on said frame between said impression rollers, means for holding the card at an angle above said plate carriage, a shaft for driving said impression rollers, a friction drive operated by said shaft for moving said plate carriage, a drive wheel loosely mounted on said shaft, clutch mechanism for connecting said drive wheel and said shaft together when desired, a treadle and mechanism operated thereby for throwing said clutch mechanism into engagement when desired, and means independent of said treadle for automatically throwing said clutch mechanism out of engagement, irrespective of the position of said treadle, before said shaft completes a single revolution, substantially as described.

19. In a plate printing machine, the combination with a frame and impression rollers journaled therein, of a plate carriage mounted to vibrate on said frame between said impression rollers, means for holding the card above said plate carriage, a shaft for driving said impression rollers, a friction drive operated by said shaft, for moving said plate carriage, and an inking roller automatically operated by the motion of the plate carriage, a drive wheel loosely mounted on said shaft, and clutch mechanism for connecting said drive wheel and said shaft together when desired, with automatic means for disconnecting said clutch mechanism before said shaft has performed a complete revolution, substantially as described.

20. In a plate printing machine, the combination with a frame and impression rollers journaled therein, of a plate carriage mounted to vibrate on said frame between said impression rollers, means for holding the card above the plate carriage, a shaft for driving said impression rollers, a friction drive operated by said shaft, for moving said plate carriage, and an inking roller automatically operated by the motion of the plate carriage, a drive wheel loosely mounted on said shaft, clutch mechanism for connecting said drive wheel and said shaft together when desired, a treadle and mechanism operated thereby for throwing said clutch mechanism into engagement when desired, and means independent of said treadle for automatically throwing said clutch mechanism out of engagement, irrespective of the position of said treadle, before the said shaft completes a single revolution, substantially as described.

21. In a plate printing machine, the combination with a frame and impression rollers journaled therein, of a plate carriage mounted to vibrate on said frame between said impression rollers, and a card carrier with means for causing same to move toward said plate carriage when released, and means for coupling said plate carriage and said card carrier together, a shaft for driving said impression rollers, a drive wheel loosely mounted on said shaft, clutch mechanism for connecting said drive wheel and said shaft together when desired, a treadle and mechanism operated thereby for releasing said card carriage, and independent mechanism, also operated by said treadle, for throwing said clutch mechanism into engagement when desired, and means independent of said treadle for automatically throwing said clutch mechanism out of engagement, irrespective of the position of said treadle before the said shaft completes a single revolution, substantially as described.

22. In a plate printing machine, the combination with a frame and impression rollers journaled therein, of a plate carriage mounted to vibrate on said frame between said impression rollers and a card carrier also mounted to vibrate on said frame, with means for moving said card carrier toward said plate carriage when released, and means for coupling said plate carriage and said card carrier together, a shaft for driving said impression rollers, a friction drive operated by said shaft for moving said plate carriage, a drive wheel loosely mounted on said shaft, clutch mechanism for connecting said drive wheel and said shaft together when desired, a treadle and mechanism operated thereby for releasing said card carrier, and independent mechanism, also operated by said treadle, for throwing said clutch mechanism into engagement when desired, and means independent of said treadle for automatically throwing said clutch mechanism out of engagement, irrespective of the position of said treadle, before said shaft completes a single revolution, substantially as described.

23. In a plate printing machine, the combination with a frame and impression rollers journaled therein, of a plate carriage mounted to vibrate on said frame between said impression rollers and a card carrier also mounted to vibrate on said frame, with means for moving said card carrier toward said plate carriage when released, and means for coupling said plate carriage and said card carrier together, a shaft for driving said impression rollers, a friction drive operated by said shaft for moving said plate carriage, and an inking roller automatically operated by the motion of the plate carriage, a drive wheel loosely mounted on said shaft, clutch mechanism for connecting said drive wheel and said shaft together when desired, a treadle and mechanism operated thereby for releasing said card carrier, and independent mechanism, also operated by said treadle, for throwing said clutch mechanism into engagement when desired, and means independent of said treadle for automatically throwing said clutch mechanism out of engagement, irrespective of the position of said treadle, before the said shaft completes a single revolution, substantially as described.

24. In a plate printing machine, the combination with a frame and impression rollers journaled therein, of a plate carriage mounted to vibrate on said frame between said impression rollers, means for holding the card above said plate carriage, a shaft for driving said impression rollers and said plate carriage, a drive wheel loosely mounted on said shaft, clutch mechanism normally tending to couple said drive wheel and said shaft together, comprising a member fast to said wheel, and a sliding member splined to said shaft, and automatic means for moving said sliding clutch member out of engagement with the opposite member before said shaft has performed a complete revolution, substantially as described.

25. In a plate printing machine, the combination with a frame and impression rollers journaled therein, of a plate carriage mounted to vibrate on said frame between said impression rollers, means for holding the card above said plate carriage, a shaft for driving said impression rollers and said plate carriage, a drive wheel loosely mounted on said shaft, clutch mechanism normally tending to couple said drive wheel and said shaft together, comprising a member fast to said wheel, and a sliding member splined to said shaft, a treadle and mechanism controlled thereby for throwing said sliding clutch member into engagement when desired, and means independent of said treadle for automatically throwing said sliding clutch member out of engagement, irrespective of the position of said treadle, before the said shaft completes a single revolution, substantially as described.

26. In a plate printing machine, the combination with a frame and impression rollers journaled therein, of a plate carriage mounted to vibrate on said frame between said impression rollers, means for holding the card above said plate carriage, a shaft for driving said impression rollers, spring supported bearings for said shaft, a friction drive operated by said shaft, for moving said plate carriage, a drive wheel loosely mounted on said shaft, and clutch mechanism for connecting said drive wheel and said shaft together when desired, with automatic means for disconnecting said clutch mechanism before said shaft has performed a complete revolution, substantially as described.

27. In a plate printing machine, the combination with a frame and impression rollers journaled therein, of a plate carriage mounted to vibrate on said frame between said impression rollers, means for holding the card above said plate carriage, a shaft for driving said impression rollers, a friction drive operated by said shaft for moving said plate carriage, a drive wheel loosely mounted on said shaft, clutch mechanism normally tending to couple said drive wheel and said shaft together, comprising a member fast to said wheel, and a sliding member splined to said shaft, a treadle and mechanism controlled thereby for throwing said sliding clutch into engagement when desired, and means independent of said treadle for automatically throwing said sliding clutch member out of engagement, irrespective of the position of said treadle, before said shaft completes a single revolution, substantially as described.

28. In a plate printing machine, the combination with a frame and impression rollers journaled therein, of a plate carriage mounted to vibrate on said frame between said impression rollers, means for holding the card above said plate carriage, a shaft for driving said impression rollers, spring supported bearings for said shaft, a friction drive operated by said shaft, for moving said plate carriage, and an inking roller automatically operated by the motion of the plate carriage, a drive wheel loosely mounted on said shaft, and clutch mechanism for connecting said drive wheel and said shaft together when desired, with automatic means for disconnecting said clutch mechanism before said shaft has performed a complete revolution, substantially as described.

29. In a plate printing machine, the combination with a frame and impression rollers journaled therein, of a plate carriage mounted to vibrate on said frame between said impression rollers, means for holding the card above the plate carriage, a shaft for driving said impression rollers, a friction drive operated by said shaft, for moving said plate carriage, and an inking roller automatically operated by the motion of the plate carriage, a drive wheel loosely mounted on said shaft, clutch mechanism normally tending to couple said drive wheel and said shaft, comprising a member fast to said wheel, and a sliding member splined to said shaft, a treadle and mechanism controlled thereby for throwing said sliding clutch member into engagement when desired, and means independent of said treadle for automatically throwing said sliding clutch member out of engagement, irrespective of the position of said treadle, before the said shaft completes a single revolution, substantially as described.

30. In a plate printing machine, the combination with a frame and impression rollers journaled therein, of a plate carriage mounted to vibrate on said frame between said impression rollers, and a card carrier with means for causing same to move toward said plate carriage when released, and means for coupling said plate carriage and said card carrier together, a shaft for driving said impression rollers, a drive wheel loosely mounted on said shaft, clutch mechanism normally tending to couple said drive wheel and said shaft, comprising a member fast to said wheel, and a sliding member splined to said shaft, a treadle and mechanism controlled thereby for releasing said card carrier, and independent mechanism, also controlled by said treadle, for throwing said sliding clutch member into engagement when desired, and means independent of said treadle for automatically throwing said sliding clutch member out of engagement, irrespective of the position of said treadle, before the said shaft completes a single revolution, substantially as described.

31. In a plate printing machine, the combination with a frame and impression rollers journaled therein, of a plate carriage mounted to vibrate on said frame between said impression rollers and a card carrier also mounted to vibrate on said frame, with means for moving said card carrier toward said plate carriage when released, and means for coupling said plate carriage and said card carrier together, a shaft for driving said impression rollers, a friction drive operated by said shaft for moving said plate carriage, a drive wheel loosely mounted on said shaft, clutch mechanism for connecting said drive wheel and said shaft together when desired, comprising a fixed member and a sliding member, a treadle and mechanism operated thereby for releasing said card carrier, and independent mechanism, also controlled by said treadle, for throwing said sliding clutch member into engagement when desired, and camming means independent of said treadle for automatically throwing said sliding clutch member out of engagement, irrespective of the position of said treadle, before said shaft completes a single revolution, substantially as described.

32. In a plate printing machine, the combination with a frame and impression rollers journaled therein, of a plate carriage mounted to vibrate on said frame between said impression rollers and a card carrier also mounted to vibrate on said frame, with means for moving said card carrier toward said plate carriage when released, and means for coupling said plate carriage and said card carrier together, a shaft for driving said impression rollers, a friction drive operated by said shaft for moving said plate carriage, and an inking roller automatically operated by the motion of the plate carriage, a drive wheel loosely mounted on said shaft, clutch mechanism for connecting said drive wheel and said shaft together when desired, comprising a fixed member and a sliding member, a treadle and mechanism operated thereby for releasing said card carrier, and independent mechanism, also controlled by said treadle, for throwing said clutch mechanism into engagement when desired, and camming means independent of said treadle for automatically throwing said sliding clutch member out of engagement, irrespective of the position of said treadle, before the said shaft completes a single revolution, substantially as described.

33. In a plate printing machine, the combination with a frame, and impression rollers journaled therein, of a plate carriage mounted to vibrate on said frame between said rollers, means for holding the card above the plate carriage, a strap under tension connected to the plate carriage, with a stiff strip connected to said strap, and intermittently acting friction rollers acting upon said strap and strip for imparting a frictional feed to said plate carriage independent of the pressure between the impression rollers, substantially as described.

34. In a plate printing machine, the combination with a frame, and impression rollers journaled therein, of a plate carriage mounted to vibrate on said frame between said rollers, means for holding the card above the plate carriage, a strap under tension connected to the plate carriage, with a stiff strip connected to said strap, and intermittently acting friction rollers acting upon said strap and strip for imparting a frictional feed to said plate carriage independent of the pressure between the impression rollers, with an ink roller automatically operated by the motion of said plate carriage for inking the plate, substantially as described.

35. In a plate printing machine, the combination with a frame, a bed roller journaled therein, and an impression roller in the form of a segment of a cylinder mounted above said bed roller, of a plate carriage mounted to vibrate on said frame between said rollers, means for holding the card above said plate carriage, a strap connected to the plate carriage, with a weight suspended therefrom, a stiff strip connected to said strap, and intermittently acting friction rollers acting upon said strap and strip for imparting a frictional feed to said plate carriage independent of the pressure between the impression rollers, substantially as described.

36. In a plate printing machine, the combination with a frame, a bed roller journaled therein, and an impression roller in the form of a segment of a cylinder mounted above said bed roller, of a plate carriage mounted to vibrate on said frame between said rollers, a strap connected to the plate carriage, with a weight suspended therefrom, a stiff strip connected to said strap and intermittently acting friction rollers acting upon said strap and strip for imparting a frictional feed to said plate carriage independent of the pressure between the impression rollers, with means for holding the card normally at an angle above and clear of the plate, except when pressed between the rollers, substantially as described.

37. In a plate printing machine, the combination with a frame, and impression rollers journaled in said frame, of a plate carriage mounted to vibrate on said frame between said impression rollers, and a card carrier provided with a series of resilient fingers for gripping the card and holding it at an angle in the card carrier, a sliding stop mounted on said card carrier, for adjusting the same to the length of the card, said stop being adjustably held in place by one or more of said resilient fingers, substantially as described.

38. In a plate printing machine, the combination with a frame, and impression rollers journaled in said frame, of a plate carriage mounted to vibrate on said frame between said impression rollers, and a card carrier provided with a series of resilient fingers for gripping the card and holding it at an angle in the card carrier, a rod journaled in said card carrier and having a flat face normally resting beneath said gripping fingers and allowing the same to grip the card but lifting said gripping fingers when said rod is locked, and a sliding stop mounted on the card carrier and normally held by one or more of said gripping fingers, substantially as described.

39. In a plate printing machine, the combination with a frame, and impression rollers journaled in said frame, of a plate carriage mounted to vibrate on said frame between said impression rollers, and a card carrier provided with a series of resilient fingers for gripping the card and holding it at an angle in the card carrier, a rod journaled in said card carrier and having a flat face normally resting beneath said gripping fingers and allowing the same to grip the card but lifting said gripping fingers when said rod is rocked, with a wrist lug secured to said rod for rocking the same, and a sliding stop mounted on the card carrier and normally held by one or more of said gripping fingers, substantially as described.

40. A card holding and releasing device for use in machines of the character described, comprising a bar having an inclined face, a rod mounted to rock in said bar and flattened along one side thereof, a series of resilient gripping fingers secured to said bar and engaging said flattened face of said rod and normally tending to restore the same to the initial position and to grip the card beyond the edge of said rod, with means for rocking said rod and thereby releasing all of said fingers from engagement with the card, and a sliding stop mounted on the card carrier and normally held by one or more of said gripping fingers, substantially as described.

41. A card holding and releasing device for use in machines of the character described, comprising a bar having an inclined face, a rod mounted to rock in said bar and flattened along one side thereof, a series of resilient gripping fingers secured to said bar and engaging said flattened face of said rod and normally tending to restore the same to the initial position and to grip the card beyond the edge of said rod, a wrist lug connected to said rod for rocking the same when desired, and a sliding stop mounted on the card carrier and normally held by one or more of said gripping fingers, substantially as described.

42. In a plate printing machine, the combination with a frame, and impression rollers journaled in said frame, of a plate carriage mounted to vibrate on said frame between said impression rollers, and a card carrier provided with a bar and a series of resilient fingers on said bar for gripping the card and holding it on the card carrier, means for adjusting said bar, a sliding stop mounted on said bar and normaly held in place by one or more of said gripping fingers, and means for simultaneously releasing all of said fingers when desired, substantially as described.

43. In a plate printing machine, the combination with a frame, and impression rollers journaled in said frame, of a plate carriage mounted to vibrate on said frame between said impression rollers, and a card carrier provided with a bar and a series of resilient fingers on said bar for gripping the card and holding it on the card carrier, means for adjusting said bar, a rod journaled in said card carrier and having a flat face normally resting beneath said gripping fingers and allowing the same to grip the card but lifting said gripping fingers when said rod is rocked, substantially as described.

44. In a plate printing machine, the combination with a frame, and impression rollers journaled in said frame, of a plate carriage mounted to vibrate on said frame between said impression rollers, and a card carrier provided with a bar and a series of resilient fingers on said bar for gripping the card and holding it on the card carrier, means for adjusting said bar, a sliding stop mounted on said bar and normally held in place by one or more of said gripping fingers, a rod journaled in said card carrier and having a flat face normally resting beneath said gripping fingers and allowing the same to grip the card but lifting said gripping fingers when said rod is rocked, substantially as described.

45. In a plate printing machine, the combination with a frame, and impression rollers journaled in said frame, of a plate carriage mounted to vibrate on said frame between said impression rollers, and a card carrier provided with a bar and a series of resilient fingers mounted on said bar for gripping the card and holding it on the card carrier, a rod journaled in said card carrier and having a flat face normally resting beneath said gripping fingers and allowing the same to grip the card but lifting said gripping fingers when said rod is rocked, with a wrist lug secured to said rod for rocking the same, and a sliding stop mounted on said bar and normally held in place by one or more of said gripping fingers, substantially as described.

46. In a plate printing machine, the combination with a frame, and impression rollers journaled in said frame, of a plate carriage mounted to vibrate on said frame between said impression rollers, and a card carrier provided with a bar and a series of resilient fingers mounted on said bar for gripping the card and holding it on the card carrier, a rod journaled in said card carrier and having a flat face normally resting beneath said gripping fingers and allowing the same to grip the card but lifting said gripping fingers when said rod is rocked, and a wrist lug secured to said rod for rocking the same, substantially as described.

47. A card holding and releasing device for use in machines of the character described comprising a bar having an inclined face, a rod mounted to rock in said bar and flattened along one side thereof, a series of resilient gripping fingers secured to said bar and engaging said flattened face of said rod and normally tending to restore the same to the initial position and to grip the card beyond the edge of said rod, with means for rocking said rod and thereby releasing all of said fingers from engagement with the card, and a sliding stop mounted on said bar and normally held in place by one or more of said gripping fingers, substantially as described.

48. A card holding and releasing device for use in machines of the character described, comprising a bar having an inclined face, a rod mounted to rock in said bar and flattened along one side thereof, a series of resilient gripping fingers secured to said bar and engaging said flattened face of said rod and normally tending to restore the same to the initial position and to grip the card beyond the edge of said rod, a wrist lug connected to said rod for rocking the same when desired, and a sliding stop mounted on said bar and normally held in place by one or more of said gripping fingers, substantially as described.

49. In a plate printing machine, the combination with a frame, a bed roller journaled therein, and an impression roller also mounted in said frame, of a plate carriage mounted to vibrate on said frame between said rollers, and a card carrier also mounted to vibrate on said frame, means for moving said card carrier toward and coupling it with said plate carriage and for uncoupling same, and means for holding the card carrier in the initial position, comprising a spring constrained detent, a rod controlled by the operator, and mechanism actuated by said rod for first withdrawing said detent, and then automatically restoring the same to the initial position during a single movement of said rod, substantially as described.

50. In a plate printing machine, the combination with a frame, a bed roller journaled therein, and an impression roller also mounted in said frame, of a plate carriage mounted to vibrate on said frame between said rollers, and a card carrier also mounted to vibrate on said frame, means for moving said card carrier toward and coupling it with said plate carriage and for uncoupling same, and means for holding the card carrier in the initial position, comprising a constrained detent, a treadle controlled by the operator, a rod pivoted to said treadle, and mechanism actuated by said rod for first withdrawing said detent, and then automatically restoring the same to the initial position during a single downward movement of said treadle, substantially as described.

In testimony whereof, I affix my signature, in presence of two witnesses.

ROBERT H. KIRK.

Witnesses:
FREDERIE C. HOWE,
JOHN R. DONALDSON.